(12) United States Patent
Mancini et al.

(10) Patent No.: US 6,367,457 B1
(45) Date of Patent: Apr. 9, 2002

(54) EVAPORATIVE EMISSION CONTROL SYSTEM

(75) Inventors: Douglas Joseph Mancini, Farmington; Thomas C. Crowley, Novi; Thomas Edwin Pearson, Jr., Redford, all of MI (US)

(73) Assignee: Ford Global Technologies, Inc, Dearborn, MI (US)

( * ) Notice: Subject to any disclaimer, the term of this patent is extended or adjusted under 35 U.S.C. 154(b) by 0 days.

(21) Appl. No.: 09/570,509

(22) Filed: May 13, 2000

(51) Int. Cl.$^7$ ............................................. F02M 33/02
(52) U.S. Cl. ..................... 123/516; 123/518; 123/519
(58) Field of Search ................................ 123/516, 517, 123/518, 519, 520

(56) References Cited

U.S. PATENT DOCUMENTS

| | | | |
|---|---|---|---|
| 5,027,780 A | | 7/1991 | Uranishi et al. |
| 5,263,462 A | * | 11/1993 | Reddy .......................... 123/520 |
| 5,398,662 A | * | 3/1995 | Igarashi et al. .............. 123/520 |
| 5,460,143 A | | 10/1995 | Narita |
| 5,474,048 A | | 12/1995 | Yamazaki et al. |
| 5,671,718 A | | 9/1997 | Curran et al. |
| 5,767,395 A | * | 6/1998 | Goto et al. ................. 73/118.1 |
| 5,816,223 A | | 10/1998 | Jamrog et al. |
| 5,884,610 A | * | 3/1999 | Reddy .......................... 123/520 |
| 5,893,353 A | | 4/1999 | Mukai |
| 5,954,034 A | | 9/1999 | Takagi |
| 5,970,957 A | | 10/1999 | Fried et al. |
| 6,305,362 B1 | * | 10/2001 | Kitamura et al. ........... 123/520 |

* cited by examiner

*Primary Examiner*—Bibhu Mohanty
(74) *Attorney, Agent, or Firm*—Jerome Drouillard

(57) ABSTRACT

An evaporative emission control system for an internal combustion engine isolates the fuel tank from the engine during purging of a carbon canister used to store fuel vapor drawn from the fuel tank during refueling. The flow of vapor from the tank to the canister is controlled by a main vapor control valve, and the flow of vapor from the canister to the engine is controlled by a purge valve. Pressure transducers are used to independently sense vapor pressure in the tank and in the canister. An electronic controller operates the valves based in part on the pressure information generated by the pressure transducers.

6 Claims, 1 Drawing Sheet

EVAPORATIVE EMISSION CONTROL SYSTEM

FIELD OF THE INVENTION

The present invention broadly relates to fuel vapor recovery systems used in internal combustion engines, and deals more particularly with a system providing fuel tank isolation during purging of vapors from a carbon storage canister.

BACKGROUND OF THE INVENTION

Evaporative emission control systems employing fuel vapor recovery have become widely used in internal combustion engine powered vehicles to prevent evaporative fuel from being emitted from a vehicle's gas tank into the atmosphere. Known evaporative emission control systems typically employ one or more carbon canisters coupled with the fuel tank and with the engine by vapor lines, and a series of valves to control the flow of fuel vapor between the fuel tank, the canister, and the engine. The canister, which is coupled to the fuel tank, uses an activated carbon bed for absorbing the hydrocarbons contained in the fuel. The canister is periodically purged by passing ambient air through the activated carbon which desorbs the hydrocarbons. The resulting air and hydrocarbon mixture is delivered through a purge valve to the intake manifold of the engine and is combined with the normal flow of fuel so as to be combusted in the engine. These systems also draw fuel vapor from the fuel tank during the purging process so that the vapors from the tank and those from the canister are combined before being drawn into the intake manifold. Pressure transducers are commonly used to sense vapor pressure at various points in the system in order to check the system for leaks, as well as to provide pressure information to an electronic engine controller that is used to operate the system's valves.

Although known evaporative emission systems are relatively effective, they are nevertheless subject to further improvements that reduce atmospheric emissions of hydrocarbons derived from fuel vapors. One of the problems of known systems is the need for regulating the flow of vapors received by the intake manifold in response to changes in the vapor pressure, relative to the intake manifold vacuum. This problem is exacerbated in those fuel recovery systems where vapor is drawn directly from the fuel tank into the engine. When the fuel tank is not completely full, and there is a volume of empty space above the fuel in the tank, there is a tendency for the fuel to slosh around while the vehicle is moving, thereby generating additional fuel vapors in the tank, and raising the vapor pressure. This increase in vapor pressure increases the level of vapor flow to the intake manifold which then must be compensated for by the appropriately modulating vapor flow through the purge valve into the engine. However, with a rapid rise or fall in the vapor pressure within the fuel tank, it is not always possible to precisely modulate the flow of vapor into the intake manifold. As a result, the combined amount of fuel and vapor combusted in the engine is not controlled as precisely as would be desired. It would therefore be desirable to more precisely control the flow of fuel vapor into the intake manifold in order to achieve more efficient fuel combustion and reduce atmospheric emissions of hydrocarbons.

SUMMARY OF THE INVENTION

A general object of the invention is to provide an evaporative emission control system that isolates the fuel tank during normal engine operation so as to allow more precise control of the delivery of recovered fuel vapor to the intake manifold of an internal combustion engine. This object is achieved by a valve system that isolates the fuel tank from a purge line that delivers vapors stored in a carbon canister through a modulated purge valve into the engine's intake manifold, during normal operation of a vehicle. During a refueling event however, the purge valve is closed and a main vapor control valve is opened that allows fuel vapor within the fuel tank to flow into the carbon canister. After refueling, while the engine is shut down, both valves are closed to prevent the flow of vapors between the tank, the canister and the engine.

Thus, according to one aspect of the invention, the evaporative emission control system provides fuel vapor to an internal combustion engine. The system includes a fuel storage tank in which fuel vapor is generated, a canister for storing fuel vapor generated within the tank, and a flow control arrangement that isolates vapors in the tank from the engine during normal operation of the engine. The flow control arrangement includes a first vapor line connecting the tank with the canister, a vapor control valve for controlling the flow of vapor through the first line, a second vapor line connecting the first line with the engine, and a purge valve for controlling the flow of vapor through the second line to the engine. First and second pressure sensors are provided for respectively sensing the fuel vapor pressure in the tank and in the canister. An electronic engine controller is employed to operate the valves, based in part on information provided by the first and second pressure sensors.

According to another aspect of the invention, a method is provided for controlling the flow of fuel vapor from a fuel tank to an internal combustion engine having an evaporative emission control system. The method includes the steps of establishing a flow of fuel vapor from a vapor storage canister to the engine, while concurrently prohibiting the flow of fuel vapor in a fuel tank to enter the canister or the engine. The method further includes the steps of, during a refueling event, prohibiting the flow of vapor into the engine, while establishing a flow of vapor from a fuel tank to the canister.

The above objects and other obvious features and advantages of the present invention are readily apparent from the following detailed description of the best mode for carrying out the invention when taken with the accompanying drawings.

DETAILED DESCRIPTION OF THE PREFERRED EMBODIMENT

Figure 1:
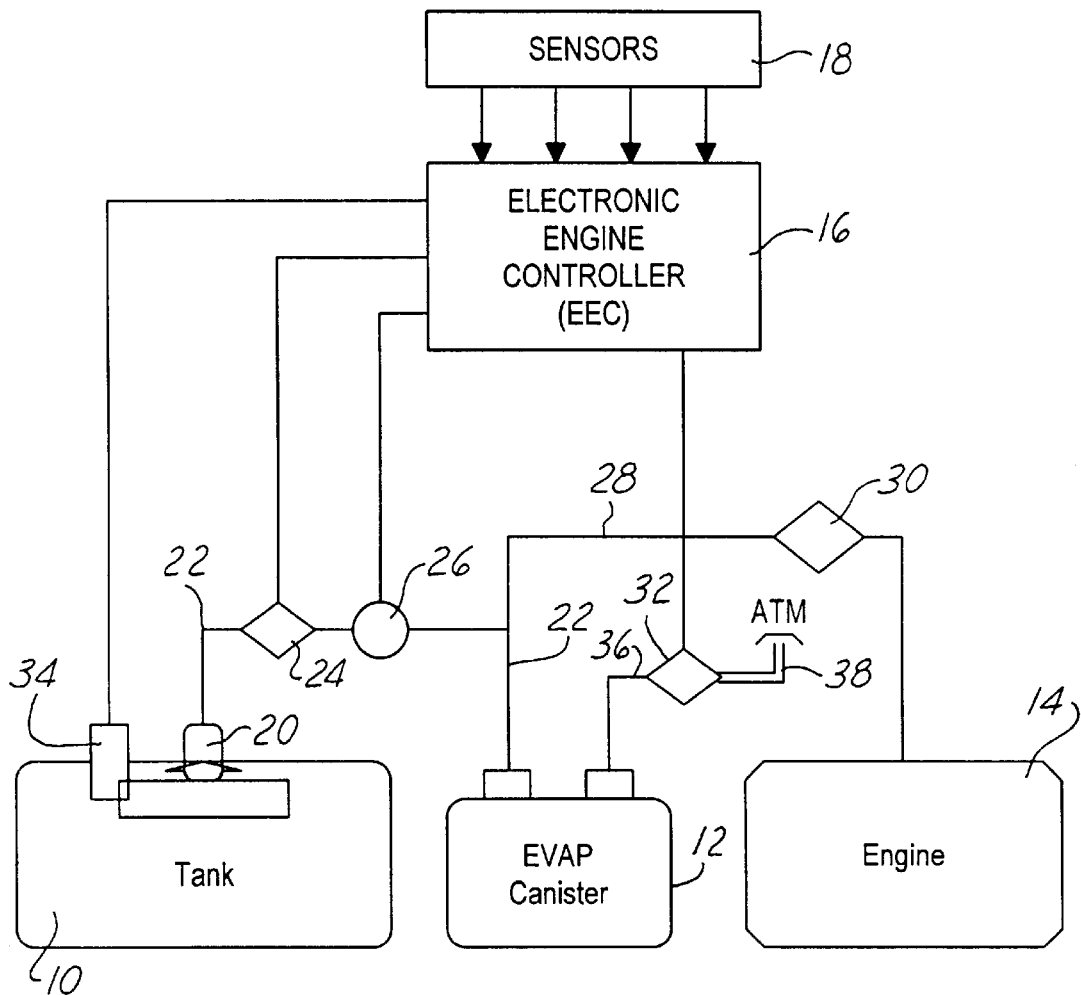
FIG. 1 is a combined block and schematic diagram of the preferred embodiment of the system of the present invention.

Referring to FIG. 1, an evaporative emission control system is employed to recover fuel vapor contained in a fuel tank 10 which stores evaporative fuel used to power an internal combustion engine 14, such as that used in an automotive vehicle. Fuel vapor is developed within the tank 10 as the result of either a refueling event or, where the tank is not completely full of fuel, the fuel tends to slosh around within a volume of air within the tank, thereby generating the vapor.

The tank 10 is provided with a vapor event valve 20, sometimes referred to as "rollover" valve to prevent the escape of fuel from a tank 10 in the event that the vehicle rolls over. The tank 10 is closed, consequently an accumulation of the vapor creates a vapor pressure therein. The outlet of the vent valve 20 is coupled by a first vapor line 22 to the outlet of the evaporative canister 12. Canister 12 is of the well-known type that includes a bed of activated carbon to adsorb hydrocarbons contained in fuel vapor. During a refueling event, the canister 12 stores the vapor hydrocarbons while preventing their release into the atmosphere, until it becomes saturated, at which time the fuel vapors stored therein may be desorbed by drawing fresh air through the canister 12, as will be discussed later.

The outlet of vent valve 20 is coupled by vapor line 22 to a solenoid operated main vapor control valve 24 which controls the flow of vapor from the tank 10 to the canister 12. The outlet of canister 12 that is coupled with line 22 also acts as an inlet when vapor is allowed to flow from the tank 10 to the canister during a refueling event, as will be described later. A pressure transducer 26 is coupled in line 22, between the main valve 24 and canister 12 functions to sense the pressure of vapors in canister 12 when the main valve 24 is closed. A pressure transducer 34 is also mounted in the tank 10 to sense the pressure of the fuel vapor therein. The pressure transducers 26, 34 operate independently so as to independently sense the vapor pressures in the canister 12 and the tank 10, respectively.

A second vapor delivery line 28 is coupled between the first line 22 and the inlet of a purge valve 30, the outlet of which is connected with the intake manifold (not shown) of the engine 14. Purge valve 30 is electrically controlled such as by pulse width modulation, with the duty cycle being used to adjust the valve so as to control the flow rate of vapors delivered to the engine 14.

The canister 12 includes a fresh air inlet line 36 connected to the outlet of a solenoid operated canister, normally closed vent valve 32. Canister vent valve 32 has an inlet coupled with a vent line 38 that is open to the ambient atmosphere.

An electronic engine controller (EEC) 16 controls the operation of valves 24, 30, and 32 based on vapor pressure information obtained by pressure transducers 26 and 34, as well as other information from any of a plurality of additional sensors 18 which may include, for example, an exhaust gas/oxygen sensor that detects changes in the fuel content of the air and vapor entering the engine 14.

In operation, fuel vapors accumulate within the closed fuel tank 10 to develop vapor pressure therein which is sensed by transducer 34 while the main valve 24 is closed during normal engine operation. With main valve 24 closed, pressure transducer 26 senses the pressure of the vapor at the outlet of canister 12, and pressure transducer 34 independently senses the pressure of the vapor in tank 10. When the engine 14 is operated in a normal mode, the EEC 16 closes valve 24 and opens valve 30 and 32. In this state, vapor in the tank 10 is prohibited from flowing either into the canister 12 or vapor line 28, and is thus isolated from the canister 12 and the engine 14. When the EEC 16 command the normally closed canister valve 32 open, fresh air is drawn into the canister 12 through lines 36, 38 and fuel vapors are drawn under the influence of the negative pressure of the intake manifold through purge valve 30 into the engine 14. Depending upon engine operating conditions as recorded by sensors 18, as well as the pressure of the vapor in canister 12, the purge valve 30 is modulated to control the rate of flow of fuel vapor into the engine 14. When the canister 12 has been fully purged of fuel vapor, the EEC 16 signals purge valve 30 to close. In any event, while valves 30 and 32 are open, the EEC 16 holds the main vale 24 closed, thereby preventing the direct flow of vapor from the tank 10 to the engine 14.

During the next refueling event, the EEC 16 signals the valve 32 to open, while maintaining purge valve 30 closed. During the refueling process, fuel vapor present within tank 10 flows out through vent valve 20 and line 22 through the open valve 24 into the canister 12 where the vapors are adsorbed and thus prevented from escaping into the atmosphere. At the end of the refueling process, with the engine 14 off, the EEC 16 closes valve 24, and continues to maintain valves 30 and 38 in their closed state. Under these conditions, with the engine 14 remaining shut down, vapor flow between the tank 10 and canister 12 is prohibited. The flow of vapor from the canister 12 to the engine 14 is likewise prohibited, and any vapors within the canister 12 are prevented from escaping through lines 36, 38 to the atmosphere by virtue of the fact that canister valve 32 is closed.

When the engine 14 is restarted, the cycle previously described is repeated. That is, valves 30 and 32 are opened to allow vapor stored in the canister 12 to flow through line 28 past purge valve 30 into the intake manifold of the engine 14 until the canister 12 is empty of vapor, at which time purge valve 30 is closed, and remains closed until the next purging event. Under normal operating conditions, when the vapor pressure in line 22 builds to a preselected pressure indicating that the canister is nearly full, as sensed by pressure transducer 26, another purge cycle is initiated.

While the invention has been shown and described in it preferred embodiment, it will be clear to those skilled in the art to which it pertains that many changes and modification may be made thereto without departing from the spirit and scope of the present invention.

What is claimed is:

1. An evaporative emission control system for providing fuel vapor to an internal combustion engine, comprising:

a fuel storage tank having an outlet port for allowing fuel vapors to exit said tank;

a canister for storing fuel vapor generated within said fuel tank; said canister having a first port for receiving air into said canister and a second port for both receiving fuel vapor from said fuel tank and allowing the exit of fuel stored vapor from said canister when said canister is purged;

a first vapor line connecting said tank outlet port with said second outlet port;

a vapor control valve for controlling the flow of vapor through said first vapor line;

a second vapor line connecting said first vapor line with said engine;

a purge valve for controlling the flow of vapor through said second line to said engine;

a first pressure sensor for sensing the pressure of said fuel vapor in said tank;

a second pressure sensor for sensing the pressure of said vapor in said canister independent of the pressure in said tank;

a controller connected with first and second pressure sensors for controlling the operation of said vapor valve and said purge valve, such that said tank is isolated from said engine and said canister when said canister is purged.

2. The system as recited in claim 1, including a normally closed canister vent valve operatively connected to said controller for controlling the flow of air into said canister through said canister inlet port.

3. The system as recited in claim 1, including a vapor vent valve for controlling the flow of vapor from said tank outlet port to said vapor control valve.

4. The system of claim 1, wherein said first pressure sensor is mounted on said tank.

5. The system of claim 1, wherein said second pressure sensor is connected in said first vapor line, between said vapor control valve and said canister.

6. The system of claim 1, wherein said purge valve is connected in said second vapor line, between said first vapor line and said engine.

* * * * *